(12) United States Patent
Häcker

(10) Patent No.: US 7,387,462 B2
(45) Date of Patent: Jun. 17, 2008

(54) SERIES OF SHAFTS AND MANUFACTORING METHOD

(75) Inventor: Uwe Häcker, Weingarten (DE)

(73) Assignee: Sew-Eurodrive GmbH & Co. KG, Bruchsal (DE)

( * ) Notice: Subject to any disclaimer, the term of this patent is extended or adjusted under 35 U.S.C. 154(b) by 407 days.

(21) Appl. No.: 10/515,717

(22) PCT Filed: Apr. 10, 2003

(86) PCT No.: PCT/EP03/03709

§ 371 (c)(1),
(2), (4) Date: Nov. 24, 2004

(87) PCT Pub. No.: WO03/100278

PCT Pub. Date: Dec. 4, 2003

(65) Prior Publication Data

US 2006/0075838 A1    Apr. 13, 2006

(30) Foreign Application Priority Data

May 24, 2002    (DE) ................................ 102 23 298

(51) Int. Cl.
*F16C 3/00*    (2006.01)
(52) U.S. Cl. ................ 403/359.6; 403/359.1; 403/359.2; 464/185
(58) Field of Classification Search ................ 403/298, 403/359.1, 359.2, 359.6; 464/182
See application file for complete search history.

(56) References Cited

U.S. PATENT DOCUMENTS 4,886,392 A * 12/1989 Iio .............................. 403/282
5,716,156 A    2/1998 Bayer et al.

FOREIGN PATENT DOCUMENTS

| DE | 37 32 223 | 4/1988 |
|---|---|---|
| DE | 41 34 552 | 3/1992 |
| EP | 0 339 380 | 11/1992 |
| EP | 0 661 474 | 11/1997 |
| EP | 0 784 758 | 5/2000 |
| EP | 1 281 884 | 2/2003 |

* cited by examiner

Primary Examiner—Robert J. Sandy
Assistant Examiner—Michael P Ferguson
(74) Attorney, Agent, or Firm—Kenyon & Kenyon LLP

(57) ABSTRACT

A series of shafts configured to attach in a bore of a receiving part and a method for manufacturing the shafts, the series including at least two different sizes, each size including different variants of shafts; wherein each shaft includes at least five contiguous axial regions, wherein each variant includes different gear teeth in the axial region of the first end of the shaft. The bore in the receiving part includes at least three axially adjacent regions, the axial regions being arranged to provide a force-locked connection between the shaft and the receiving part when the shaft is pressed into the receiving part and such that the toothed or milled region of the shaft cuts into the bore in a form-locked manner as a result of the shaft being pressed in.

31 Claims, 8 Drawing Sheets

Centering    Centering

SERIES OF SHAFTS AND MANUFACTORING METHOD

FIELD OF THE INVENTION

The present invention relates to a series of shafts and a manufacturing method. The present invention also relates to manufactured shanks.

BACKGROUND OF THE INVENTION

European Published Patent Application No. 0 339 380 describes a device for coaxially connecting two parts in a rotatably fixed manner, where a transverse, threaded pin is used for axial fixing. However, such a device may be expensive to manufacture, since the transverse, threaded pin represents an additional part and a corresponding tap hole suitable for this transverse, threaded pin must be prepared.

A press-fit assembly for a rotor shaft is described in German Published Patent Application No. 37 32 223. In this context, the toothed region of a shaft is inserted into a bore of a receiving part, shavings being formed in response to the shaft being pressed in in a form-locked manner. Annular grooves are provided for collecting the shavings formed in response to the form-locked pressing. In addition, the shaft has at least two fitting regions (FIGS. 4, 6, 7). Therefore, the manufacturing of the press-fit structure is complicated and expensive due to, in particular, the at least two fitting regions and the annular grooves. Furthermore, it may be disadvantageous that a press fit for absorbing the axial forces is not present. Axial forces even allow rotor core 8 to strike rear walls and increase frictional losses.

A pinion fixture for planetary gears is described in German Published Patent Application No. 41 34 552, where a pinion is provided with a fitting region and a standardized, hardened, and ground, knurl toothing and is pressed into the receiving part at an elevated temperature. Annular grooves are provided for collecting the shavings. The fitting region and the toothing have different outer diameters. The manufacturing of this pinion fixture is also complicated and expensive, in particular, because of the annular grooves and the different outer diameters of the toothing and the fitting region. In this instance, it may also be disadvantageous that no reassembly of an already previously assembled pinion fixture is possible, for it is clearly mentioned in column 3, line 12 of German Published Patent Application No. 41 34 552, that a press fit is provided. When attaching the shaft for reassembly, this press fit, in particular in region 5, and the fact that the axial length of region 5 is greater than the axial length of region 3, do not allow the engagement of the gear teeth of the shaft with the inner gear teeth already pressed in and present in the bore from the first assembly, to be felt or sensed.

European Published Patent Application No. 0 784 758 describes a shaft fixture, which has two fitting regions (FIGS. 1 and 2, regions A and C). Upon inserting the shaft into the bore of a receiving part, the keyed connection is achieved by pressing it in in a form-locked manner. The torque is transmitted by toothed, knurled or milled region B. It may be disadvantageous that region C cannot transmit a torque. In this context, relative movements in regions A and C result in frictional fatigue fractures. It may also be disadvantageous that two fitting regions (regions A and C) are necessary, and that a large overall length is consequently necessary. In addition, the manufacture of two fitting regions is very expensive. Furthermore, the bore has three different diameters, which are also difficult to fabricate. Necessary regions A and C are exclusively centering aids, which do not contribute anything to the transmission of torque.

European Published Patent Application No. 0 661 474 describes a shaft fixture, which has two fitting regions and a bore having three different diameters. Such a shaft fixture is also expensive to manufacture. In another variant, a shaft fixture having only two different bore diameters is also described. This variant is also expensive, since the fitting regions and the inner walls of the bore must be machined so accurately, that, on one hand, no shavings are formed when introducing the shaft for pressing it into the bore, and that, on the other hand, after insertion, i.e., in the pressed-in state after assembly, no gaps are formed between the shaft and the inner wall of the bore. The torque is transmitted by toothed or milled region B. It may also be disadvantageous that region A cannot transmit a torque. Necessary regions A and C are exclusively centering aids for the pressing operation, which do not contribute anything to the transmission of torque. Reassembly is not possible or very difficult to carry out, since region C is longer than region B' of the receiving part.

Described in European Published Patent Application No. 1 281 884 is a series of shafts 1, which are connectable to a receiving part that possesses a bore 3 having a single bore diameter. At least cylindrical region B2 and knurled region B1 of the shaft are pressed into this bore 3. In this context, it may be disadvantageous that reassembly is only possible with great difficulty, for after shaft 1 is pressed into the receiving part and then extracted again, it is impossible to find the gear-tooth position upon reattaching the shaft for the purpose of reconnection, since in the case of a slightly attached shaft, the milled edge in region B1 is outside of the receiving part and cylindrical region B2 must be pressed in by force. However, if cylindrical region B2 is reinserted deeply or far into the receiving part, it is only possible to rotate shaft 1 using a large force. Thus, when the milled edge of region B1 lightly meets the knurled inner edge of the receiving part produced by the original joining procedure and then rotation occurs, it is extremely difficult to sense the engagement of the milled edge with the knurled inner edge, for the torques required for the rotation necessary for this are large and the torque fluctuations produced by the engagement of the milled edge are very small. Thus, reassembly in a conventional manner, in particular, finding the engagement by hand, is impossible.

BRIEF SUMMARY OF THE INVENTION

An example embodiment of the present invention may provide a shaft fixture, in which the manufacturing and storage costs may be kept low and the shaft fixture may therefore be able to be manufactured inexpensively, with little outlay.

In an example embodiment of the present invention, the series of shafts for attachment in a bore of a receiving part includes at least two different sizes, which each include different variants of shafts.

In the case of the series, features of an example embodiment of the present invention include that:

a) the shaft has, in each instance, at least five axial regions A, B, C, D, and F, which are contiguous in the alphabetical order of the letters denoting them, and of which F has a greater outer diameter than A, B, and/or C;

b) included within a size are several variants of shafts, which each have different tooth constructions in region F of the shaft, e.g., different outer diameters;

c) region C of the shaft has gear teeth or is knurled;

d) within a first size, and at least in a first variant, the shaft does not have gear teeth in regions A and B;

e) in at least a second variant within the first size, the root zones of the grooves formed by the slots of the gear teeth of region F also extend at least partially into region B or into regions B and A of the shaft;

f) the bore in the receiving part is divided up into at least three axially adjacent regions G', H' and J', region G' being assigned to region A when the shaft is fixed in the receiving part, and region H' being assigned to region C when the shaft is fixed in the receiving part, and region J' being contiguous to region H';

g) in region G', the bore in the receiving part has an inner diameter, which is mathematically equal to or greater than a value d;

h) shaft region A includes sub-region A1 of the receiving part and sub-region A2 adjacent to it, sub-region A1 having an outer diameter which is equal to or less than diameter d of region G', and the outer diameter of sub-region A2 being equal to or greater than the outer diameter in sub-region A1, so that a force-locked connection is provided when the shaft is pressed into the receiving part;

i) shaft region B is contiguous to region A2, and region C is contiguous to region B, the outer diameter of region B being less than the outer diameter of region C; and j) when the shaft is pressed into the receiving part, toothed or milled region C of the shaft cuts into or notches region H' of the bore in a form-locked manner as a result of the shaft being pressed in.

The force-locked connection in region A2 may transmit axial forces as well. Furthermore, it may be provided that the shaft to be fixed or the shank, e.g., the pinion shaft, is centrically mounted. After satisfying correspondingly high assembly accuracy or accuracy requirements, regions A, B, C, D and F enter the bore of the receiving part one after another during the pressing or pressing procedure. In this instance, sub-region A1 and region B pre-center and guide the shaft during assembly. Since the diameter of region A is less than the inner diameter of region G', exact centering may only be rendered possible upon the entry of region A, e.g., A2, of the shaft. For the diameter of region A1 may be designed to be a little less than the outer diameter of region A2, e.g., one to six hundredths. Thus, upon further pressing, region A2 guides the shaft centrically. This may provide a high degree of stability in opposition to transverse forces. Instead of the mentioned difference in diameter in the range of one to six hundredths, other differences in diameter may also be provided, e.g., while using temperature differences between the receiving part and the shaft during the pressing procedure.

Described regions A1 and B allow an interference fit of region A2 with G', a higher centering accuracy being attainable due to the absence of play. Therefore, it may be provided that axial forces are transmittable in the region of this interference fit.

Regions A, B, and C are then pressed in upon further insertion of the shaft. Therefore, a form-locked connection is produced in knurled or toothed region C.

The actual transmission of force and torque is mainly rendered possible in region C with the aid of the form-locked connection.

The outer diameter in region B is less than the outer diameter in region C, e.g. one to three tenths less. A1 and B may be arranged so that during assembly, it is possible to "line up" the shaft "by hand" upon attaching it.

According to an example embodiment of the present invention, the manufacturing of the shaft may be simplified and inexpensive. For example, the buffing is rendered possible in one machining operation, the radial distance of the processing tool being adjustable over the axial region.

In addition, the manufacturing costs and storage costs may be kept low, since no couplings are necessary between the shaft, e.g., including the transmission-side running gears, and the receiving part. Therefore, the shaft fixture may be inexpensively manufactured with little outlay.

The end of the receiving part may be provided with a centering device, which is used to centrically mount the shaft. Since the axial dimension of region A is equal to or greater than that of region H', the shaft is guided or supported while the shaft is inserted into the bore of the receiving part, e.g., while the milled edge of region C is pressed into the material of the receiving part, in region H', because the outer diameter of the insertion pinion in region B may be adjusted to the inner diameter of the receiving part in region H' for mounting. Consequently, the shaft is centrically supported when it is lined up and inserted. Therefore, regions A1 and B form a centering device and/or two-point contact bearing upon insertion.

In addition, the bore does not have several, but only two different, easily manufactured, inner bore diameters, e.g., one in region G' that is less than that in region H'.

The centric guidance provided by suitably dimensioned regions A1 and G' arranged relative to each other may become greater with increased insertion of the shaft. Then, the same also applies to A2 and G' upon further increasing insertion. Therefore, transverse forces produce a smaller and smaller radial deflection of the shaft in response to increased insertion.

The shaft may be arranged to be as large as possible in regions A, B, and C, e.g., only a little smaller than the outer diameter of toothed region F. This may result in high strength, e.g., in torsion. However, in other variants of the series, the outer diameter of region F may be arranged to be considerably larger, since the gear-tooth data correspondingly differ. In this case, region D may be advantageous for reducing the stress concentration. Without region D, the shaft may then only be usable for transmitting small torques and absorbing small axial forces and/or radial forces. The exact shape of region D may be optimized by calculations using finite element methods.

Grooves of the tooth spaces of region F may run through regions D and C and into region B and, depending on the gear-tooth data, also into region A, without markedly deteriorating the strength or other characteristics of the shaft fixture. Therefore, an example embodiment of the present invention may also allow the gear teeth of the region to be manufactured easily and inexpensively, while simultaneously having as large a diameter as possible in regions C, B, and A of the shaft, i.e., while simultaneously having high strength. The exact shape of the profile is a function of the gear-tooth data of region F.

A sufficiently high centering accuracy may be attainable, using only unilateral guidance during insertion. The magnitude of the centering accuracy may suffice for a servo drive, e.g., in the connection of the servomotor to the servo gears. For a high accuracy may be maintained in the case of high-speed planetary gearing to be connected to the servomotor. In example embodiments of the present invention, the shaft may be used as a sun of the first driving gear stage. In this instance, a high centering accuracy of the shaft may be maintained, since the sun of the first gear stage, e.g., of the high-speed servo gears, may be centered in an extremely accurate manner.

Reassembly may also be rendered possible. For after the shaft is pressed into the receiving part and then extracted again, it may be simple to find the gear-tooth position when reattaching the shaft for the purpose of reconnecting, since in the case of a slightly attached shaft, i.e., when the milled edge is attached to the receiving part, a press fit is not yet present in region B and at cylindrical end region A1 attached to the receiving part, and consequently, the shaft may still be easily rotated, e.g., by hand, with respect to the receiving part. If the inner knurl of the receiving part produced by the original connecting, and the milled edge of region B and the beginning of region C engage, this may be detected, for the torques required for the rotation necessary for this are small, and the torque fluctuations produced by the engagement of the milled edge are sufficiently large. Thus, reassembly in a conventional manner, e.g., finding the engagement by hand, is rendered possible. For this, it may be provided that the axial length of region A2 is basically less than or equal to the axial length of region H' of the receiving part.

An advantage over that described in European Published Patent Application No. 0 661 474 may be that the shaft and the receiving part may be arranged to be axially shorter, because shaft region A of FIG. 1 of European Published Patent Application No. 0 661 474 B1 may not be necessary for implementing an example embodiment of the present invention.

In an example embodiment, and within the size, the variants having different tooth constructions in region F, i.e., at least the first variant and the second variant, may each be fixed in an identical receiving part. In this context, it may be provided that the receiving part may be implemented as a coupling for connection to a motor, the coupling always being manufactured in the same manner for the different variants. Therefore, the interface, i.e., connection, between the shaft and the receiving part is varied by cutting such that the neck of the shaft is frictionally connectible to the bore in the receiving part, while retaining advantages hereof. Thus, the toothing on the side of the gearing, i.e., toothed region F, may vary, and consequently, various gear ratios may be provided in the same receiving part. In this context, the motor is then selected in the size which matches the size of the gearing, without being overdimensioned or underdimensioned.

In an example embodiment, the series of shafts includes, within a size, variants, i.e., at least the first variant and the second variant, which are identically toothed in region F and may each be fixed in receiving parts of different sizes, e.g., motor shafts of different sizes of motors. In this context, it may be provided that the gear unit may be directly mounted to motors of a motor series, which includes several sizes of motors. Therefore, as a direct connection, i.e., a so-called direct attachment, of a gear unit to the different motors, e.g., to the differently sized motor shafts of differently sized motors within the motor series may be provided. This direct attachment may allow the entire drive unit, including motor and gear unit, to become more compact and consequently require less volume. In this manner, a motor that appears to be overdimensioned at first glance, i.e., a representative of a large size of the motor series, is also connectible, which is then driven, however, at reduced operating values, i.e., not at the rated torque or the maximum torque. This may provide thermal and control-engineering advantages. In particular, a large torque may be transmitted to the gear unit in the case of short cycle times. In order to be able to fix the shaft to motor shafts of different sizes, only different variants of the shaft may be provided. A special coupling may be superfluous. Consequently, the number of parts may also be reduced, and the storage costs and administrative costs may be lowered.

In an example embodiment, a radial transition from the somewhat larger outer diameter of shaft region F to the somewhat smaller outer diameter of region C may be provided in region D. This may reduce the stress concentration and, consequently, the risk of failure.

In an example embodiment, the shaft may include a so-called spiral groove in region A for purposes of venting, i.e., a groove spiraling along the circumference. In this instance, the strength may not suffer, although the spiral groove in region A. The spiral groove intersects the outgoing gear-tooth groups of region F, which, depending on the gear-tooth data, extend into region A. Since the spiral groove may also be simple and inexpensive to manufacture, venting may be achieved during the insertion of the shaft, without deteriorating the strength or other characteristics. The venting may result in the advantage that the centering may be carried out in a simpler manner, and with lower transverse forces.

In an example embodiment, the gear teeth in region F of the shaft may be helical, having a non-zero angle of skew. It may be provided that particularly low-noise gear units are consequently manufacturable.

In an example embodiment, region J' of the bore may be simultaneously arranged as a centering aid and manufacturing aid, e.g., for use with the workpiece clamping device or for use when mounting a workpiece. In addition, it may be provided that the receiving part may be mounted on points during manufacture, and therefore, a high concentricity of the bore may be attainable. In this context, this manufacturing aid may be manufactured to be simultaneously usable as a centering aid while lining up the shaft in the bore of the receiving part.

In an example embodiment, the receiving part may have a mounting groove for engaging with and supporting a tool, by which the shaft may be pressed into the receiving part. It may be provided that the required centering accuracy is consequently attainable during the pressing procedure.

In the method for manufacturing a shaft fixture, it may be provided that during the insertion and/or pressing procedure, a temperature of the receiving part, e.g., in its interior, and a temperature of the shaft, e.g., in its interior, are not equal. The temperature of the receiving part and the temperature of the shaft may differ by more than 60 Kelvin. In this instance, it may be provided that a particularly rigid connection, which is force-locked in sub-regions of region A, is formed after temperature equalization and contraction caused by it. Depending on the arrangement, the connection in shaft region A formed in this manner may be arranged to be stronger than the form-locked connection in region C.

BRIEF DESCRIPTION OF THE DRAWINGS

FIG. 4b is a cross-sectional view of the shaft illustrated in FIG. 4a.

Figure 1A:
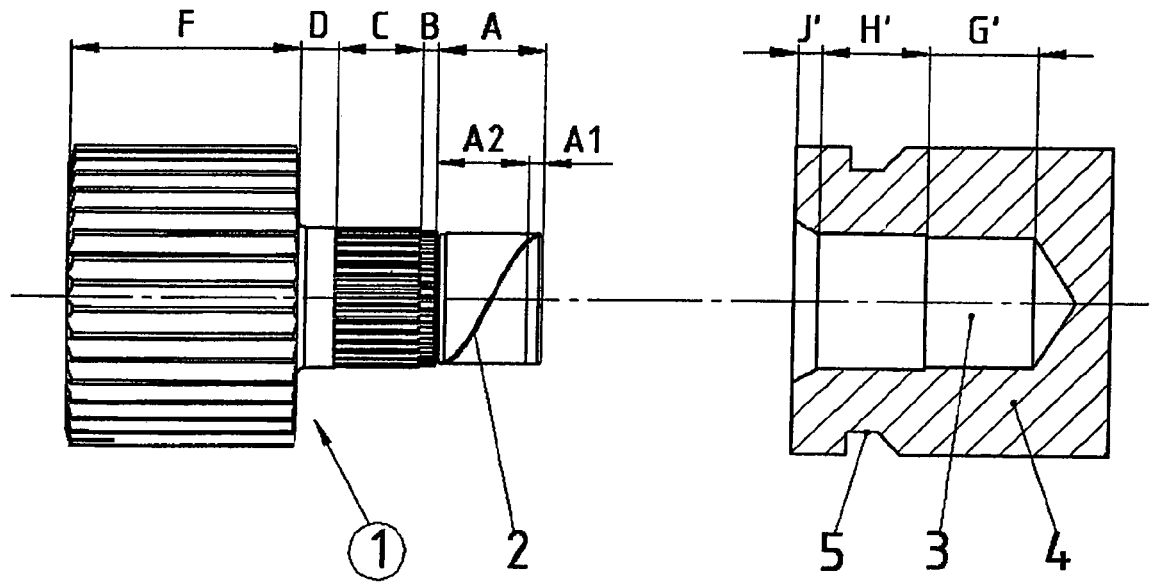
FIG. 1a illustrates a shaft and a receiving part separated.

LIST OF REFERENCE NUMERALS 1 shaft
2 spiral groove
3 bore
4 receiving part
5 mounting groove

DETAILED DESCRIPTION OF THE INVENTION

Example embodiments of the present invention are explained in detail with reference to the appended Figures.

A shaft 1 and a receiving part 4 provided with a bore 3 are each separately illustrated in FIG. 1a.

Figure 1B:
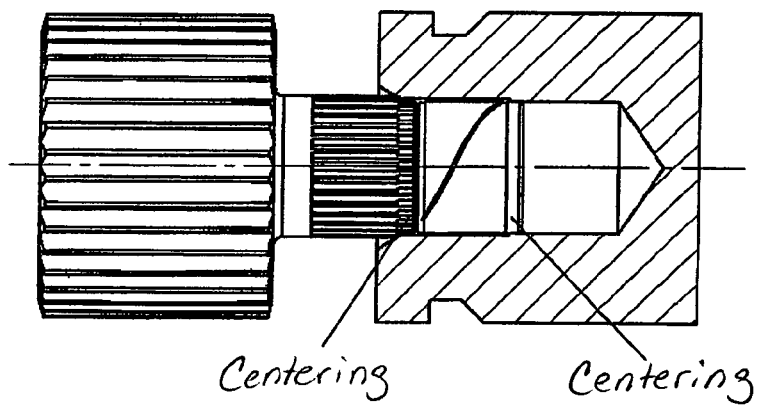
FIG. 1b illustrates a shaft and a receiving part at a start of assembly.

In FIG. 1b, shaft 1 and receiving part 4 are illustrated at the start of assembly, i.e., when the shaft is lined up in receiving part 4.

Figure 1C:
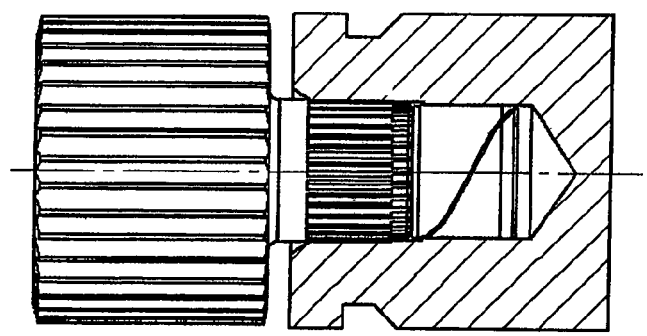
FIG. 1c illustrates a shaft and a receiving part at an end of assembly.

In FIG. 1c, shaft 1 and receiving part 4 are illustrated at the end of assembly, i.e., in the pressed-in, fixed state.

Figure 2A:
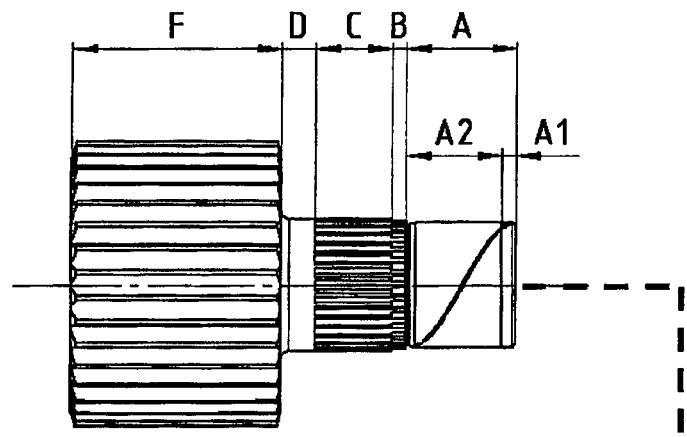
FIGS. 2a to 2c illustrate attachment of different shafts of a series to a receiving part.
Figure 2B:
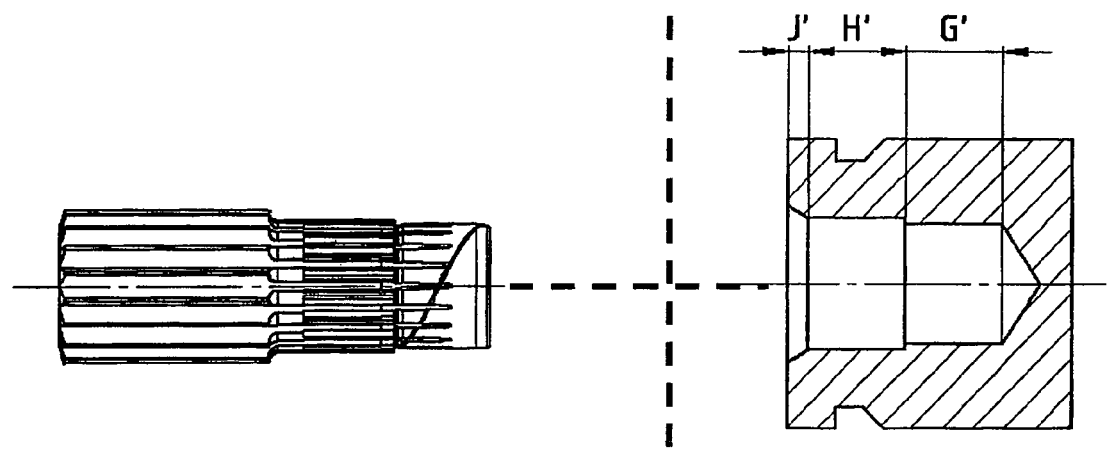
Figure 2C:
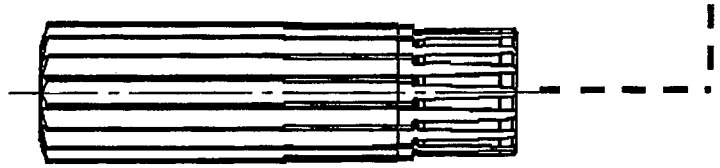

The attachment of different shafts of the series to a receiving part, for example, a coupling, is illustrated in FIGS. 2a, 2b and 2c. In this context, the different shafts are each individually denoted as FIG. 2a, FIG. 2b, and FIG. 2c.

Figure 3A:
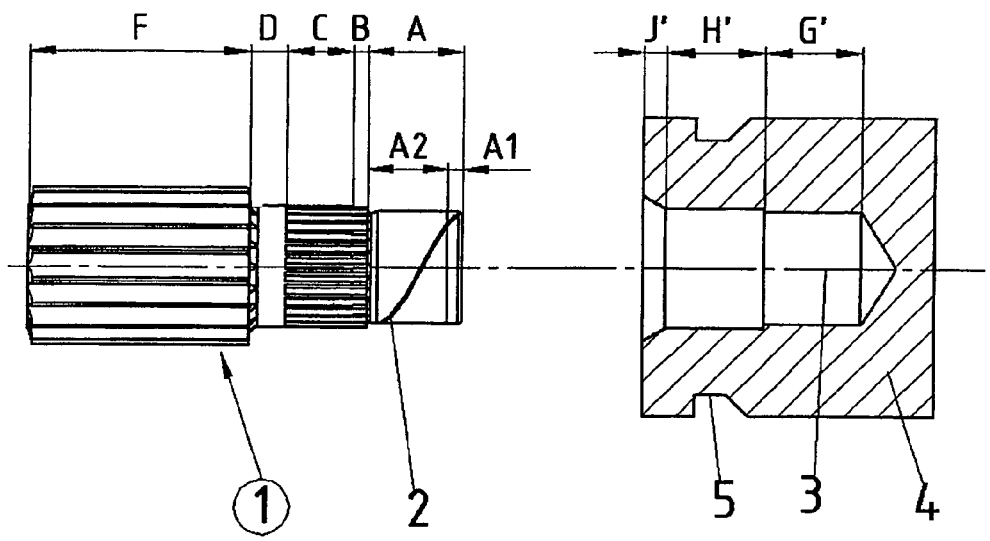
FIG. 3a to 3c illustrate attachment of a shaft constructed with different necks to different receiving parts.
Figure 3B:
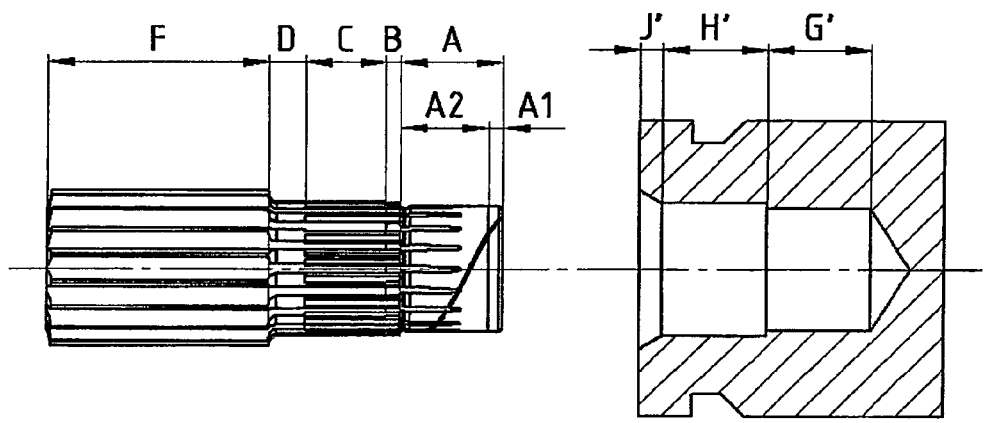
Figure 3C:
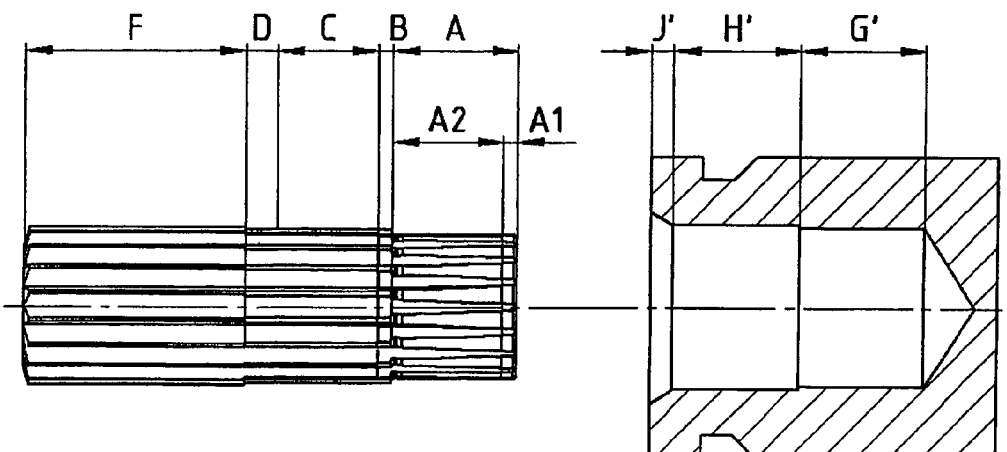

Illustrated in FIG. 3a, FIG. 3b, and FIG. 3c is the attachment of a shaft constructed with different necks, to correspondingly different receiving parts, e.g., as a direct attachment to different motor shafts of a motor series.

An exemplary embodiment of the present invention is illustrated in FIG. 1a. In this context, shaft 1 has a cylindrical region A on its end on the side of the receiving part, region A including a sub-region A1 and a sub-region A2. The outer diameter of region A1 is a little smaller than in sub-region A2, in order that the shaft may be lined up quickly and easily in the bore. Milled regions B and C are adjacent to region A, the outer diameter in region B being less than in region C in order to allow the shaft to be lined up in a rapid and simple manner. However, the outer diameter in region B is greater than the outer diameter in regions A1 and A2. During manufacture, regions B and C are first provided with a milled edge, subsequently hardened, and finally brought to a specific outer diameter by buffing.

The cutting of the teeth, i.e., the manufacturing of the toothing, of region F may include the conventional manufacturing methods, such as, e.g., milling using a milling tool, or grinding with the aid of a grinding wheel, etc. When the radius of the toothing root circle in region F, i.e., the deepest point of each tooth space, is less than the outer radius, i.e., the largest radius, in each of regions D, C, B, and A, then, in this instance, a partial cut is also made into this adjacent region C and also in region B, since the specific tool operates at a radius. Therefore, the root zones of the grooves formed by the gear-tooth spaces of region F extend through at least regions D and C, as a function of the gear-tooth data. Depending on the gear-tooth data, they also extend into region B or even into region A.

The axial dimensions of the extending tooth spaces are a function of the radius of the tools and the sizing and dimensions of the shaft. When the root circle radius of the gear teeth in region F is greater than the outer radius in regions B and A, then no tooth spaces are cut into regions A and B.

Region C is milled, and the tooth spaces of the gear teeth extend through region C. Region B is also milled like region C, but the outer diameter being reduced in comparison with the outer diameter in region C. Region D does not have a milled edge. Therefore, a simple and inexpensive tool may be used to produce the milled edge for regions B and C.

Receiving part 4 has a bore 3, which has at least two different inner diameters in the two regions G' and H'. In this context, the axial length of region H' arranged on the side of the shaft is matched to the axial distance between regions A1 and B. For example, the axial length of H' is equal to the axial length of A2. Consequently, the lining-up procedure may be easily possible and two-point support may be present as of the start of the lining-up procedure, the two-point support constituting centering during the assembly. The axial length of region G' is equal to or greater than the axial length of region A of the shaft.

In region G', the inner diameter of the bore of the receiving part is greater than or equal to the value d. It may be suitable for the tolerance to be H7. The outer diameter of shaft region A1 is less than the value d. Tolerance h6 may be suitable. In order to produce a force-locked connection to region G' of the bore, an outer diameter a little larger than value d is used in region A2. Consequently, in response to the pressing, material is somewhat deformed in region A1, and a frictional connection capable of supporting a high load may be produced. However, the difference in the value of the outer diameter and the value of the inner diameter in region G' may be between 10 µm and 100 µm, e.g., 30 µm.

In an exemplary embodiment of the present invention, the gearing of region F may be manufactured to have helical gear teeth. Therefore, and because of the frictional and force-locked connection in regions A1 and A2, particularly low-noise operation of the gear stage containing region F may be rendered possible.

In an exemplary embodiment of the present invention, region F may be implemented as spur gearing for use as a sun in an input planetary gear stage.

During the manufacturing of the gear teeth of region F, a cut is made into milled region C. Therefore, the milled edge of region C may always be manufactured in the same manner, regardless of the gear-tooth data of region F. An advantage of this arrangement may be that, upon insertion of shaft 1 into bore 3 of the receiving part, the same milled edge may always be pressed into the receiving part and the consequently produced, form-locked connection between shaft 1 and receiving part 4 may always be manufactured in a substantially identical manner. Therefore, there may be no risk at all of weakening this connection as a result of unfavorable gear-tooth data of region F. For example, the numbers of teeth of region C and region F may be equal, without the position of the teeth on the circumference of the shaft relative to each other being significant for the connection.

A spiral groove 2 is additionally introduced in region A and is used for venting while shaft 1 is inserted into bore 3 of the receiving part.

During the insertion of the shaft into the receiving part, the hard milled edge of region C cuts into the inner wall of the bore in region H'. The diameter of bore 3 in region G' is less than the diameter in region H'.

Arranged between milled region C and region F provided with gear teeth is a region D, which constitutes a transition region from the larger outer diameter of the shaft in region F to the smaller outer diameter in region C. In an exemplary embodiment of the present invention, this transition may be implemented, using a radius. In an exemplary embodiment of the present invention, this transition may include a transition region having a different radius and a linear transition region illustrated in FIGS. 1a, 1b, and 1c, which axially expands much further.

In each case, the sensitivity to stress concentration may be reducible when this transition, e.g., the radius, is suitably arranged. In exemplary embodiments of the present invention, other radii or also other shapes may be provided in the transition region.

In FIG. 1c, it is also illustrated that, in an exemplary embodiment of the present invention, bore 3 in the receiving part is arranged to be so deep, that a hollow space is present after the end of assembly. In exemplary embodiments of the present invention, this hollow space may be omitted.

In exemplary embodiments of the present invention, different gearing may also be usable in place of the milled edge. At least involute toothing should be understood as toothing.

In an exemplary embodiment of the present invention, region J' of bore 3 is designed to be conical for centering purposes, having an angle of, e.g., 60°. This centering aid may facilitate the insertion of the shaft into bore 3 and therefore may reduce the costs and effort. In exemplary embodiments of the present invention, other angles or centering aids may also be provided. At the same time, this centering aid may also be used as a manufacturing aid for holding the receiving part between points, and therefore, high concentricity may be attainable.

In exemplary embodiments of the present invention, the receiving part may be surrounded by a coupling or a motor, e.g., an electric motor. For example, the rotor shaft of the motor or a shaft piece of the coupling may be manufactured as the receiving part having the bore.

In exemplary embodiments of the present invention, the pinion driving the shaft may be for a gear unit. Consequently, parts may be dispensed with, and a form-locked connection, which may make do with few parts and may be simple to assemble, may be produced with extremely low expenditure for manufacturing and assembly.

For example, in exemplary embodiments of the present invention, region F of the shaft may be at least partially useable as a sun of a planetary gear unit. This direct coupling may save further parts, such as couplings, etc.

Three variants of shafts with the corresponding receiving parts are illustrated in FIG. 2. The individual variants of the shafts are represented in FIG. 2a, FIG. 2b, and FIG. 2c.

The same receiving part may always be used for all of the shafts illustrated in FIGS. 2a to 2c. In the three different variants, gear-tooth region F is manufactured differently. Therefore, the shaft may be used in a gear unit, which has different gear ratios as a function of the variant. The receiving part may be implemented as a coupling for connection to a motor, the coupling, e.g., always being manufactured in the same manner for the different variants. Therefore, the interface, i.e., connection, between the shaft and the receiving part may be varied on the side of the shaft by cutting such that the neck of the shaft may be frictionally connectible to the bore in the receiving part. Thus, the toothing on the side of the gearing, i.e., toothed region F, may vary, and consequently, various gear ratios may be provided in the same receiving part. In this context, the motor is then selected in the size which matches the size of the gearing, without being overdimensioned or underdimensioned. The different design of toothing region F in the three variants of the shaft in illustrated in FIG. 2 may allow the root zones of the grooves formed by the tooth spaces of the gear teeth of region F to extend in region F up to region A, as a function of the root-circle diameter of the toothing. If the root diameter of the gear teeth in region F is greater than in regions A, B, C, and D, as is the case with the variant illustrated in FIG. 2a, then these regions are not cut.

In the variant illustrated in FIG. 2b, the milled edge is cut, since the root zones of the grooves formed by the tooth spaces of the gear teeth of region F extend past region C.

In the variant illustrated in FIG. 2c, the milled edge in region C is omitted, since the gear-tooth data illustrated in FIG. 2c are selected to render the gear teeth so large, that the root zones of the grooves formed by the tooth spaces of the gear teeth of region F extend to region C so as to remove too much material of the milled edge.

Therefore, the milled edge may be omitted in the case of such gear-tooth data. Consequently, the power transmission occurs via the gear-tooth spaces of region F extending into region C, i.e., via the correspondingly formed grooves.

The so-called direct attachment is illustrated in FIG. 3.

In this context, three variants, which belong to one size and have the same toothing in region F, are illustrated in FIGS. 3a, 3b, and 3c. They may be fixed, in each instance, in receiving parts of different sizes, e.g., motor shafts of differently sized motors. In the case of the motor shafts, the bore may always be manufactured large enough to correspond to the size, since only this may allow the maximum transmittable torque to be transmitted. In the series, it may be provided that the gear unit may be directly joined to motors of a motor series, which includes three sizes of motors illustrated in FIGS. 3a to 3c. Therefore, a gear unit may be directly connected, i.e., directly attached, to the different motors, e.g., to the different sizes of motor shafts of differently sized motors within the motor series. This direct attachment may allow the entire drive unit, including motor and gear unit, to become more compact and consequently require less volume. In this manner, a motor that appears to be overdimensioned at first glance, i.e., a representative of a large size of the motor series, may additionally be connectible, which is then driven, however, at reduced operating values, i.e., not at the rated torque or the maximum torque. This may provide thermal and control-engineering advantages. For example, a large torque may be transmitted to the gear unit in the case of short cycle times. In order to be able to fix the shaft to motor shafts of different sizes, only different variants of the shaft may need to be provided. A special coupling may be superfluous. Consequently, the number of parts may also be reduced, and the storage costs and administrative costs may be lowered. As illustrated in FIGS. 3a to 3c, shaft regions A, B, C, and D may be manufactured to correspond to the size of the receiving part, i.e., the size of the motor shaft.

In an exemplary embodiment of the present invention, the milled edge in regions B and C may be completely omitted, the root-circle diameter of the gear teeth in region F then being less than the outer diameter in region C. Therefore, the gear teeth and their grooves extending into region C assume the function of the milled edge. In this context, one may make sure that the gear-tooth data are suitable and, consequently, that the cutting or machining volume is selected to be sufficiently small, in order that the pressing force for pressing the shaft into the receiving part may be generated.

Series should be understood to include a set of devices, which may be subdivided or classified into subsets referred to as sizes. The criterion for classification may be of a geometric type, such as the diameter of a shaft and/or elevation of a shaft above the base plate. However, it may also be the rated torque, the maximum transmittable torque, the input or output power, or another characteristic quantity, etc. For example, mixtures of criteria are also possible. Instead of series, the phrase construction kit may also be used.

The milled edge worked into regions C and B of the shaft is characterized by a number N of teeth. The toothing in region F is characterized by number Z of teeth. If N and Z have at least one common prime factor, region C cut as illustrated in FIG. 2b or FIG. 3b has a symmetry at the circumference, for the geometric shape at the circumference repeats after an angle of 360°/p. If numbers of teeth N and Z have a plurality of common prime factors, the symmetry is correspondingly greater. For example, when $Z=24=2*2*2*3$ and $N=12=2*2*3$, the same shape is to be expected again at the circumference after 30°. The result of the symmetry is that, as the shaft is pressed into the receiving part, fewer radial forces may be generated, and therefore, the pressing may be carried out with a higher centering accuracy. The pressing tool may also be designed to be correspondingly simpler and more cost-effective.

In the case of numbers of teeth $Z=24=2*2*2*3$ and $N=21=3*7$, a symmetry of 120° is present. In the case of numbers of teeth $Z=24=2*2*2*3$ and $N=22=3*11$, a symmetry of 120° is present. In the case of numbers of teeth $Z=24=2*2*2*3$ and $N=20=2*2*5$, a symmetry of 90° is present. In this case, an advantage may be provided, when $N=21\pm1$ is selected as the number of teeth of the milled edge. For, during the manufacture of the milled edge, the number of teeth may only be defined completely accurately in a costly manner. In the case of similar, but not identical blanks, the number of teeth may be increased or decreased by one tooth. Thus, in the case of the mentioned selection of $Z=24$ and $N=20$, 21 or 22, at least a symmetry of 180° is present, and consequently, the pressing operation may be made easier and the centering accuracy may be improved. Then, the mentioned advantage may also apply to numbers of teeth Z, which are multiples of 6, i.e., $Z=6$, 12, 18, 24, 30, or 36, etc. Therefore, it may be important that the three adjacent numbers of teeth $N=20$, 21 and 22 have at least 2 or 3 as a prime factor, which are both prime factors of 6 and their multiples.

Figure 4A:
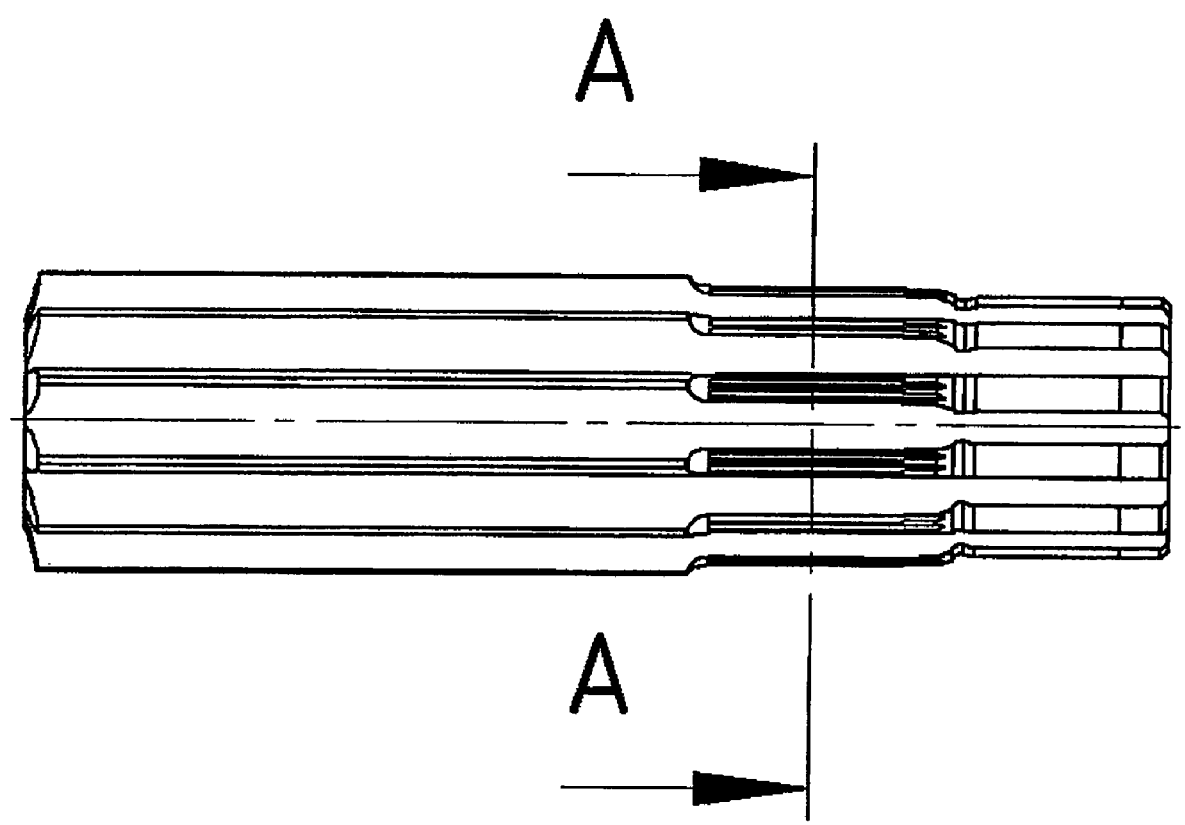
FIG. 4a illustrates a shaft having a cut region.
Figure 4B:
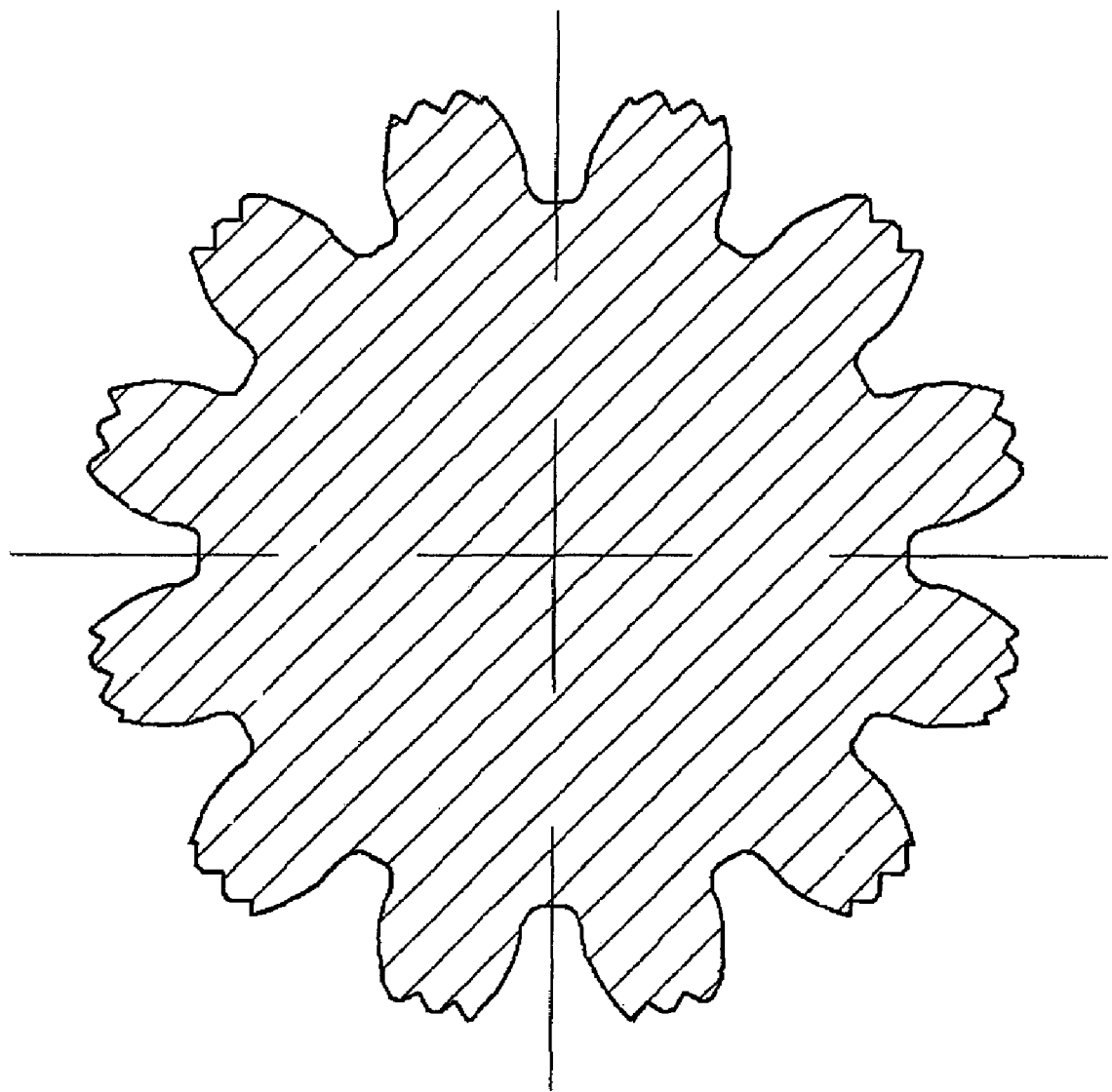
Figure 4C:
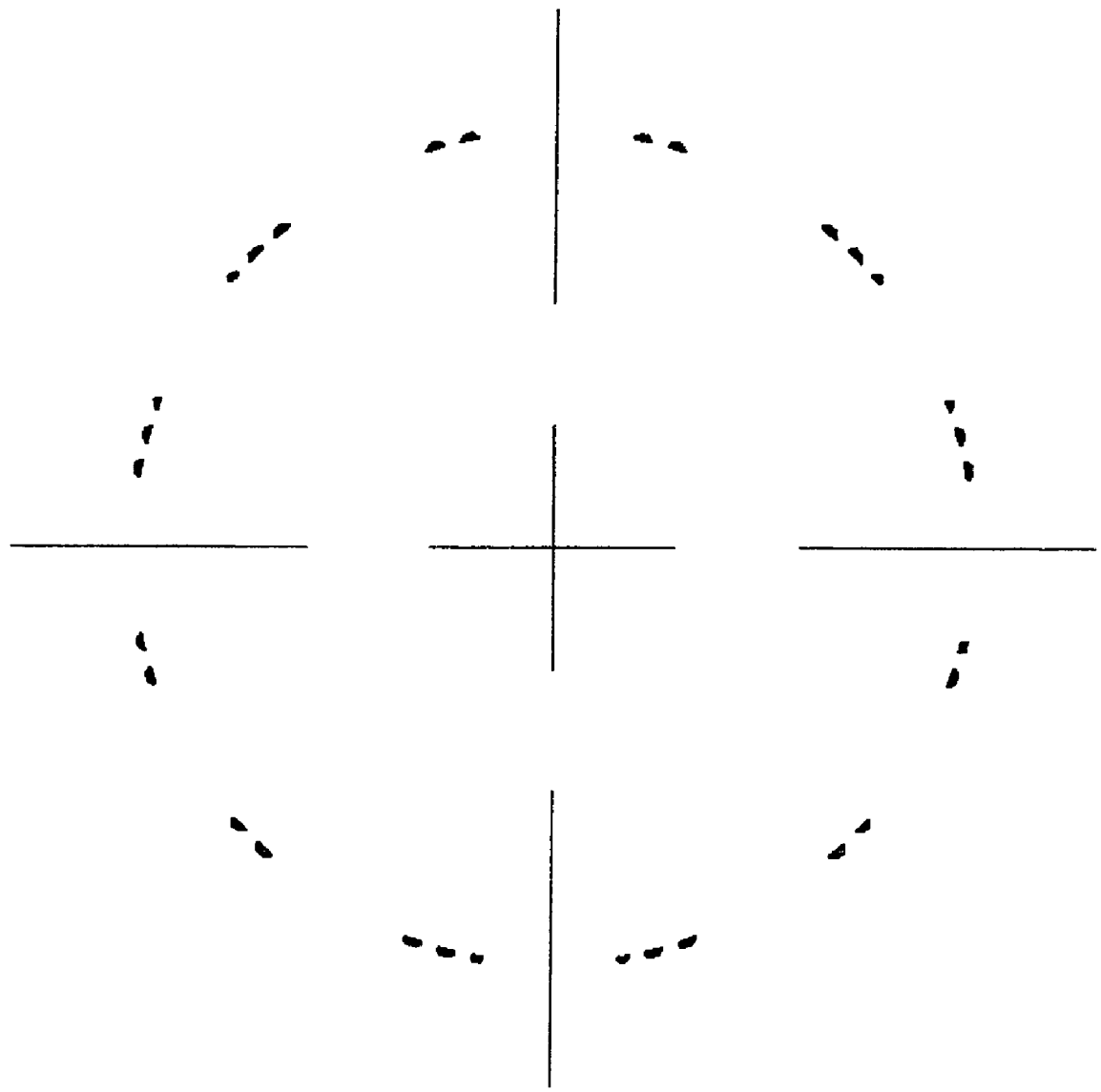
FIG. 4c illustrates regions removed or deformed in an inner bore of a receiving part.

In FIG. 4a, a shaft having a cut region C is illustrated as an exemplary embodiment of the present invention, where A indicates a section illustrated in FIG. 4b. In this instance, the number of teeth of the milled edge is $N=75$. The number of teeth of the toothing in region F is $Z=12$. In the cut region of the figure, it is illustrated that each tooth retains three raised parts, i.e., three remaining teeth of the milled edge. FIG. 4c illustrates the regions, which are removed or deformed in the inner bore of the receiving part. These regions have a 120° symmetry. Therefore, the pressing may be carried out in a simple manner. Adjacent numbers $N=76$ or $N=74$ each have at least the number 2 as a common prime factor and, consequently, a 180° symmetry, along with the corresponding advantage during the pressing procedure.

Figure 5B:
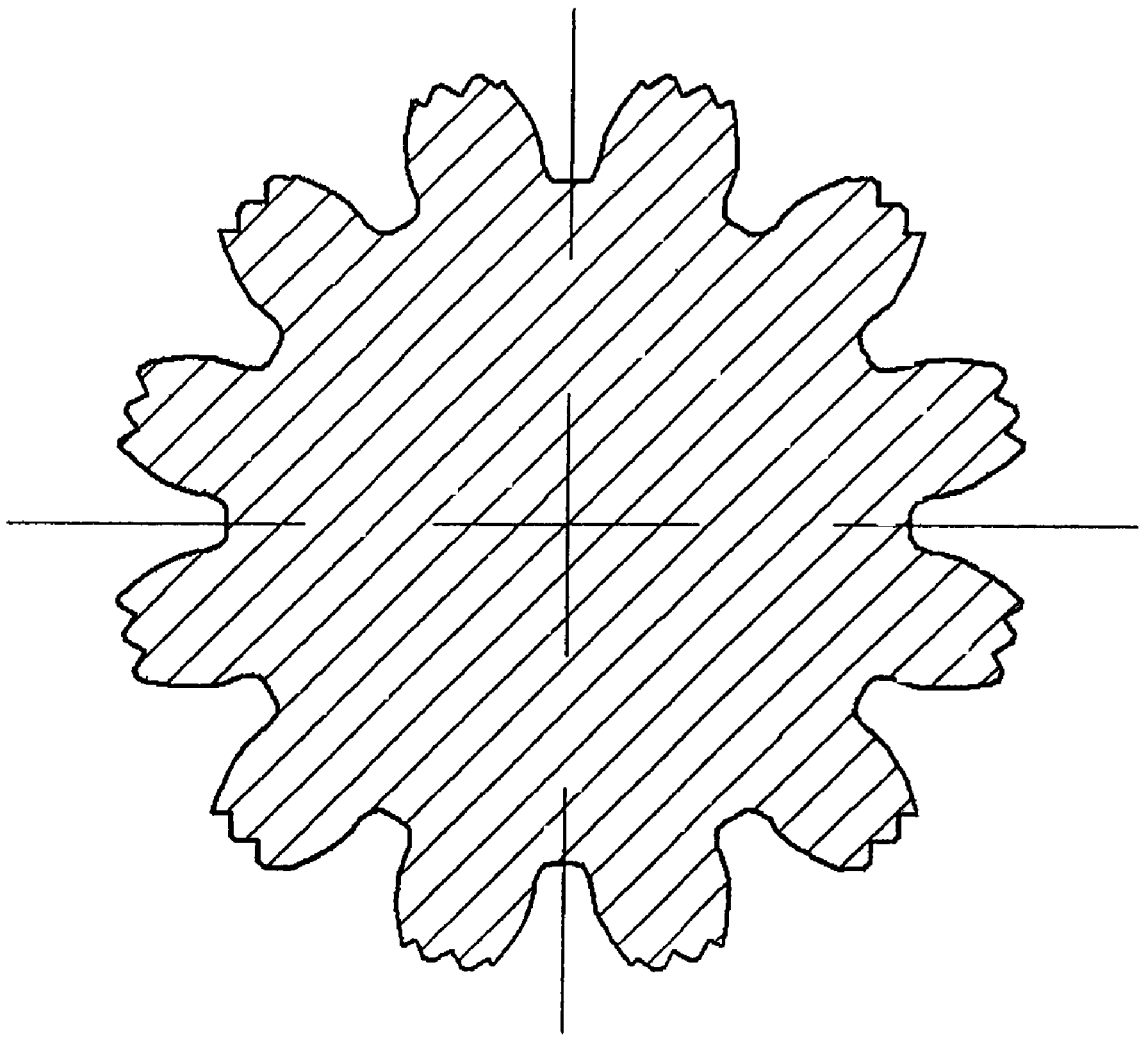
FIGS. 5b and 5c respectively correspond to FIGS. 4b and 4c for a shaft having a milled-edge tooth number of N=74.
Figure 5C:
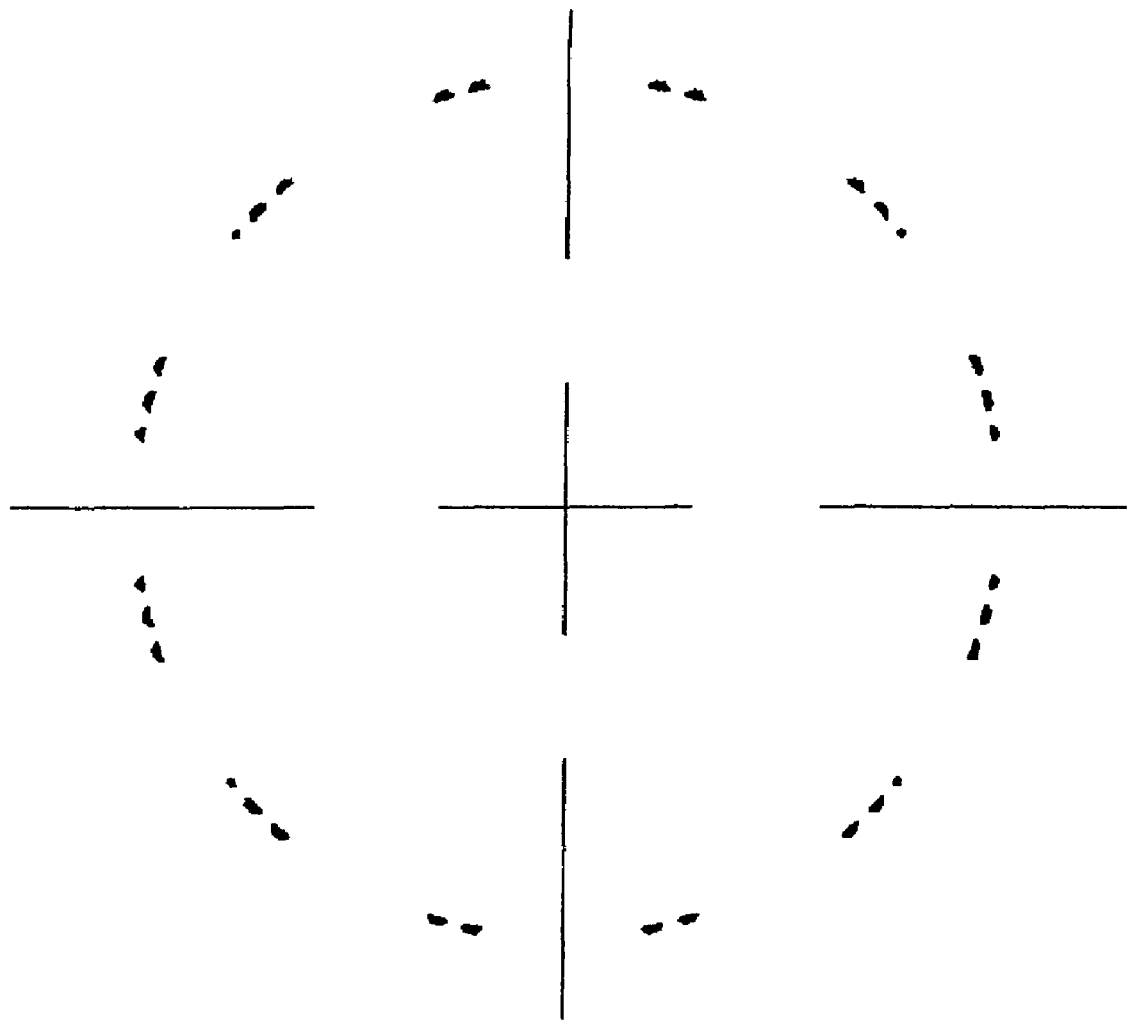

In the case of a shaft having a milled-edge tooth number $N=74$, FIGS. 5b and 5c illustrate the figures corresponding to FIGS. 4b and 4c.

The invention claimed is:
1. An arrangement, comprising:
 a series of shafts configured to attach in a bore of a receiving part, the series including at least two different sizes, each size including different variants of shafts;
 wherein each shaft includes at least five contiguous axial regions, an axial region of a first end of the shaft having a greater outer diameter than at least one of three axial regions of a second end of the shaft;
 wherein each variant includes different gear teeth in the axial region of the first end of the shaft;
 wherein a third axial region from the second end of the shaft is one of (a) toothed, (b) knurled and (c) milled;
 wherein in a first size and at least in a first variant, a first axial region from the second end of the shaft and a second axial region from the second end of the shaft do not include gear teeth;
 wherein in at least a second variant within the first size, root zones of grooves formed by slots of the gear teeth in the axial region of the first end of the shaft extend one of (a) at least partially into the second axial region from the second end of the shaft and (b) through the second axial region from the second end of the shaft into the first axial region from the second end of the shaft;
 wherein the bore in the receiving part includes at least three axially adjacent regions: an innermost axial region of the bore corresponding to the first axial region from the second end of the shaft when the shaft is fixed in the receiving part, a middle axial region of the bore corresponding to the third axial region from the second end of the shaft when the shaft is fixed in the receiving part, an outermost axial region of the bore adjacent to the middle axial region of the bore;
 wherein the first axial region from the second end of the shaft includes a first subregion toward the second end of the shaft and a second subregion adjacent to the first subregion, an outer diameter of the first subregion being less than or equal to an inner diameter of the innermost axial region of the bore and an outer diameter of the second subregion greater than or equal to the outer diameter of the first subregion arranged to provide a force-locked connection between the shaft and the receiving part when the shaft is pressed into the receiving part;
 wherein the second axial region from the second end of the shaft is contiguous to the second subregion, the third axial region from the second end of the shaft contiguous to the second axial region from the second end of the shaft, an outer diameter of the second axial region from the second end of the shaft being less than an outer diameter of the third axial region from the second end of the shaft; and
 wherein the third axial region from the second end of the shaft is configured to cut into the middle axial region of the bore in a form-locked manner in accordance with pressing of the shaft into the receiving part.

2. The arrangement according to claim 1, wherein each variant includes a different outer diameter in the axial region of the first end of the shaft.

3. The arrangement according to claim 1, wherein variants within the size having different gear teeth in the axial region of the first end of the shaft are fixable in an identical receiving part.

4. The arrangement according to claim 1, wherein the first variant and the second variant are fixable in an identical receiving part.

5. The arrangement according to claim 1, wherein variants within a size are identically toothed in the axial region of the first end of the shaft and are fixable in receiving parts having different sizes.

6. The arrangement according to claim 5, wherein the receiving parts having different sizes include motor shafts of differently sized motors.

7. The arrangement according to claim 1, wherein the first variant and the second variant are identically toothed in the axial region of the first end of the shaft and are fixable in receiving parts having different sizes.

8. The arrangement according to claim 1, wherein the third axial region from the second end of the shaft is configured to form, in accordance with an overload, a form-locked connection to the middle axial region of the bore.

9. The arrangement according to claim 1, wherein the gear teeth in the axial region of the first end of the shaft are helical, having a non-zero angle of skew.

10. The arrangement according to claim 1, wherein the outermost axial region of the bore is configured as a centering aid and a manufacturing aid.

11. The arrangement according to claim 1, wherein the receiving part corresponds to one of (a) a part of a coupling and (b) a motor shaft.

12. The arrangement according to claim 1, wherein the receiving part includes a motor shaft of a driving motor.

13. The arrangement according to claim 1, wherein the shaft is drivable by a pinion for a gear unit.

14. The arrangement according to claim 1, wherein the shaft is drivable by a pinion for a gear unit, the pinion arranged as a spur gear.

15. The arrangement according to claim 1, wherein at least part of the axial region of the first end of the shaft is arranged as a sun of a planetary gear.

16. The arrangement according to claim 1, wherein the receiving part includes a mounting groove configured to engage with and to support a tool adapted to press the shaft into the receiving part.

17. The arrangement according to claim 1, wherein the shaft includes a spiral groove in the first axial region from the second end of the shaft configured to at least one of (a) equalize pressure and (b) vent during pressing of the shaft into the receiving part.

18. The arrangement according to claim 1, wherein the shaft includes a groove that spirals along a circumference in the first axial region from the second end of the shaft configured to at least one of (a) equalize pressure and (b) vent during pressing of the shaft into the receiving part.

19. The arrangement according to claim 1, wherein an axial length of the second subregion is less than or equal to an axial length of the middle axial region of the bore.

20. The arrangement according to claim 1, wherein an axial length of the second subregion plus an axial length of the second axial region from the second end of the shaft is less than or equal to an axial length of the middle axial region of the bore.

21. The arrangement according to claim 1, wherein a number of teeth of a milled edge in the third axial region from the second end of the shaft is one of three adjacent numbers having at least two prime factors, a number of teeth of the gear teeth in the axial region of the first end of the shaft having at least one prime factor in common with each of the three adjacent numbers.

22. The arrangement according to claim 1, wherein in a third variant, the third axial region from the second end of the shaft is not knurled and includes gear teeth corresponding to the gear teeth of the axial region of the first end of the shaft.

23. The arrangement according to claim 1, wherein in a third variant, the third axial region from the second end of the shaft is not knurled, root zones of grooves formed by gear-tooth spaces of the axial region of the first end of the shaft extending into the third axial region from the second end of the shaft.

24. A shaft for attachment in a bore of a receiving part, comprising:

at least five contiguous axial regions, an axial region of a first end of the shaft having a greater outer diameter than at least one of three axial regions of a second end of the shaft, a third axial region from the second end of the shaft being one of (a) toothed and (b) knurled, a first axial region from the second end of the shaft, a second axial region from the second end of the shaft and a fourth axial region from the second end of the shaft having no gear teeth, the bore in the receiving part including at least three axially adjacent regions: an innermost axial region of the bore corresponding to the first axial region of the second end of the shaft when the shaft is fixed in the receiving part, a middle axial region of the bore corresponding to the third axial region from the second end of the shaft and an outermost axial region of the bore adjacent to the middle axial region of the bore, the first axial region from the second end of the shaft including a groove spiraling along the circumference for venting while the shaft is inserted into the bore, a first subregion toward the second end of the shaft and a second subregion adjacent to the first subregion, an outer diameter of the first subregion being less than or equal to an inner diameter of the innermost axial region of the bore and an outer diameter of the second subregion being greater than or equal to the outer diameter of the first subregion arranged to provide a force-locked connection when the shaft is pressed into the receiving part, the second axial region from the second end of the shaft contiguous to the second subregion, the third axial region from the second end of the shaft contiguous to the second axial region from the second end of the shaft, an outer diameter of the second axial region from the second end of the shaft being less than an outer diameter of the third axial region from the second end of the shaft, the third axial region from the second end of the shaft configured to cut into the middle axial region of the bore in a form-locked manner in accordance with pressing of the shaft into the receiving part.

25. A shaft for attachment in a bore of a receiving part, comprising:

at least five contiguous axial regions, an axial region of a first end of the shaft having a greater outer diameter than at least one of three axial regions of a second end of the shaft, a third axial region from the second end of the shaft being one of (a) toothed and (b) knurled, root zones of grooves formed by gear-tooth spaces of the axial region of the first end of the shaft extending through a fourth axial region from the second end of the shaft and the third axial region from the second end of the shaft and one of (a) at least partially into a second axial region from the second end of the shaft and (b) into the second axial region from the second end of the shaft and a first axial region from the second end of the shaft, the bore in the receiving part including at least three axially adjacent regions: an innermost axial region of the bore corresponding to the first axial region from the second end of the shaft when the shaft is fixed in the receiving part, a middle axial region of the bore corresponding to the third axial region from the second end of the shaft when the shaft is fixed in the receiving part, and an outermost axial region of the bore adjacent to the middle axial region of the bore, the first axial region from the second end of the shaft including a first subregion toward the second end of the shaft and a second subregion adjacent to the first subregion, an outer diameter of the first subregion being less than or equal to an inner diameter of the innermost axial region of the bore and an outer diameter of the second subregion greater than or equal to the outer diameter of the first subregion arranged to provide a force-locked connection when the shaft is pressed into the receiving part, the second axial region from the second end of the shaft contiguous to the second subregion, the third axial region from the second end of the shaft contiguous to the second axial region from the second end of the shaft, an outer diameter of the second axial region from the second end of the shaft being less than an outer diameter of the third axial region from the second end of the shaft, the third axial region from the second end of the shaft configured to cut into the middle axial region of the bore in a form-locked manner in accordance with pressing of the shaft into the receiving part.

26. A method for manufacturing a shaft fixture including a shaft for attachment in a bore of a receiving part, the shaft including at least five contiguous axial regions, an axial region of a first end of the shaft having a greater outer diameter than at least one of three axial regions of a second end of the shaft, a third axial region from the second end of the shaft being one of (a) toothed and (b) knurled, a first axial region from the second end of the shaft, a second axial region from the second end of the shaft and a fourth axial region from the second end of the shaft having no gear teeth, the bore in the receiving part including at least three axially adjacent regions: an innermost axial region of the bore corresponding to the first axial region of the second end of the shaft when the shaft is fixed in the receiving part, a middle axial region of the bore corresponding to the third axial region from the second end of the shaft, an outermost axial region of the bore adjacent to the middle axial region of the bore, the first axial region from the second end of the shaft including a groove spiraling along the circumference for venting while the shaft is inserted into the bore, a first subregion toward the second end of the shaft and a second subregion adjacent to the first subregion, an outer diameter of the first subregion being less than or equal to an inner diameter of the innermost axial region of the bore and an outer diameter of the second subregion being greater than or equal to the outer diameter of the first subregion arranged to provide a force-locked connection when the shaft is pressed into the receiving part, the second axial region from the second end of the shaft contiguous to the second subregion, the third axial region from the second end of the shaft contiguous to the second axial region from the second end of the shaft, an outer diameter of the second axial region from the second end of the shaft being less than an outer diameter of the third axial region from the second end of the shaft, the third axial region from the second end of the shaft configured to cut into the middle axial region of the bore in a form-locked manner in accordance with pressing of the shaft into the receiving part, the method comprising:
at least one of (a) pressing and (b) inserting the shaft into the receiving part, during the at least one of (a) the pressing and (b) the inserting, a temperature of the receiving part and a temperature of the shaft being unequal.

27. The method according to claim 26, wherein during the at least one of (a) the pressing and (b) the inserting, the temperature of an interior of the receiving part is unequal to the temperature of an interior of the shaft.

28. The method according to claim 26, wherein during the at least one of (a) the pressing and (b) the inserting, the temperature of the receiving part and the temperature of the shaft differ by more than 60 Kelvin.

29. A method for manufacturing a shaft fixture including a shaft for attachment in a bore of a receiving part, the shaft including at least five contiguous axial regions, an axial region of a first end of the shaft having a greater outer diameter than at least one of three axial regions of a second end of the shaft, a third axial region from the second end of the shaft being one of (a) toothed and (b) knurled, root zones of grooves formed by gear-tooth spaces of the axial region of the first end of the shaft extending through a fourth axial region from the second end of the shaft and the third axial region from the second end of the shaft and one of (a) at least partially into a second axial region from the second end of the shaft and (b) into the second axial region from the second end of the shaft and a first axial region from the second end of the shaft, the bore in the receiving part including at least three axially adjacent regions: an innermost axial region of the bore corresponding to the first axial region from the second end of the shaft when the shaft is fixed in the receiving part, a middle axial region of the bore corresponding to the third axial region from the second end of the shaft when the shaft is fixed in the receiving part, and an outermost axial region of the bore adjacent to the middle axial region of the bore, the first axial region from the second end of the shaft including a first subregion toward the second end of the shaft and a second subregion adjacent to the first subregion, an outer diameter of the first subregion being less than or equal to an inner diameter of the innermost axial region of the bore and an outer diameter of the second subregion being greater than or equal to the outer diameter of the first subregion arranged to provide a force-locked connection when the shaft is pressed into the receiving part, the second axial region from the second end of the shaft contiguous to the second subregion, the third axial region from the second end of the shaft contiguous to the second axial region from the second end of the shaft, an outer diameter of the second axial region from the second end of the shaft being less than an outer diameter of the third axial region from the second end of the shaft, the third axial region from the second end of the shaft configured to cut into the middle axial region of the bore in a form-locked manner in accordance with pressing of the shaft into the receiving part, the method comprising:
at least one of (a) pressing and (b) inserting the shaft into the receiving part, during the at least one of (a) the pressing and (b) the inserting, a temperature of the receiving part and a temperature of the shaft being unequal.

30. The method according to claim 29, wherein during the at least one of (a) the pressing and (b) the inserting, the temperature of an interior of the receiving part is unequal to the temperature of an interior of the shaft.

31. The method according to claim 29, wherein during the at least one of (a) the pressing and (b) the inserting, the temperature of the receiving part and the temperature of the shaft differ by more than 60 Kelvin.

* * * * *